United States Patent [19]

Tsau

[11] Patent Number: 4,816,268
[45] Date of Patent: Mar. 28, 1989

[54] PROCESS FOR PREPARING A COMESTIBLE CONTAINING STIRRER STRAW AND PRODUCT THEREOF

[76] Inventor: Josef H. Tsau, 5348 Brummel St., Skokie, Ill. 60077

[21] Appl. No.: 85,828

[22] Filed: Aug. 14, 1987

[51] Int. Cl.⁴ .............................................. A23L 1/236
[52] U.S. Cl. ...................................... 426/85; 426/132; 426/134; 426/548; 426/420; 427/2; 427/230; 427/430.1; 424/400
[58] Field of Search ................... 426/85, 86, 134, 420, 426/106, 392, 421, 132, 548; 127/59; 427/2, 230, 430.1; 424/400

[56] References Cited

U.S. PATENT DOCUMENTS

| | | | |
|---|---|---|---|
| 239,561 | 3/1881 | Shields | 426/106 |
| 250,333 | 12/1881 | Behr | 127/59 |
| 256,622 | 4/1882 | Behr | 127/59 |
| 686,978 | 11/1901 | Kiefer | 426/397 |
| 723,496 | 3/1903 | Stadtegger | 426/397 |
| 724,477 | 4/1903 | Hitzl | 127/59 |
| 1,254,115 | 1/1918 | Brand | 206/207 |
| 1,770,118 | 7/1930 | Williams | 426/86 |
| 1,996,203 | 4/1935 | Hollingsworth | 426/85 |
| 2,128,448 | 8/1938 | Lamoine Wright | 426/85 |
| 2,128,760 | 8/1938 | Shapiro | 426/132 |
| 2,812,257 | 11/1957 | Scisorek | 426/82 |
| 2,857,908 | 10/1958 | Cornfield | 426/134 |
| 2,901,357 | 8/1959 | Epstein | 426/85 |
| 3,099,565 | 7/1963 | Neuhauser | 426/85 |
| 3,154,418 | 10/1964 | Lovell | 426/78 |
| 3,202,275 | 8/1965 | Loughary | 426/86 |
| 3,252,803 | 5/1966 | Belasco | 426/86 |
| 3,312,555 | 4/1967 | Rossi et al. | 426/134 |
| 3,326,695 | 6/1967 | Neuhauser | 426/85 |
| 3,428,460 | 2/1969 | Ely | 426/80 |
| 3,469,997 | 9/1969 | Rossi et al. | 426/134 |
| 3,526,316 | 9/1970 | Kalogris | 426/86 |
| 3,620,759 | 11/1971 | Maddox | 426/78 |
| 3,620,770 | 11/1971 | Harvey | 426/25 |
| 3,717,476 | 2/1973 | Harvey | 426/85 |
| 3,730,737 | 5/1973 | Harvey et al. | 426/85 |
| 3,824,322 | 7/1974 | Fiorella | 426/85 |
| 3,869,555 | 3/1975 | Heonis | 426/134 |
| 4,061,783 | 12/1977 | Hoffman et al. | 426/134 |
| 4,199,373 | 4/1980 | Dwivedi et al. | 127/60 |
| 4,199,374 | 4/1980 | Dwivedi et al. | 127/60 |

FOREIGN PATENT DOCUMENTS

| | | | |
|---|---|---|---|
| 655333 | 1/1963 | Canada | 426/134 |
| 2635417 | 2/1978 | Fed. Rep. of Germany | 426/85 |
| 2158298 | 6/1973 | France | 426/134 |

OTHER PUBLICATIONS

Critical Reviews in Food Science & Nutrition, "New Sweeteners" 6/76, Crosby, p. 297 plus especially p. 302.

*Primary Examiner*—Steven Weinstein

[57] ABSTRACT

This disclosure relates to a device for dispensing a comestible product into a liquid. In particular, the device is capable of dispensing unit dose amounts of a comestible product into a liquid.

15 Claims, 3 Drawing Sheets

PROCESS FOR PREPARING A COMESTIBLE CONTAINING STIRRER STRAW AND PRODUCT THEREOF

This application is a continuation-in-part of prior application Ser. No. 06/831,017 filed on Feb. 18, 1986 which is hereby abandoned and was a continuation of parent application Ser. No. 06/660,764 filed Oct. 15, 1984.

INTRODUCTION

The manufacture of typical solid unit dosage compositions, such as tablets and capsules containing one or more active ingredients, requires sophisticated equipment operating at high speed, as well as substantial capital investment. In addition, various excipients are incorporated with the active ingredient in order to increase the volume of a unit dose composition to a manageable size, and/or provide other properties to the composition such as binding, lubricating, disintegrating, dissolution rate enhancing, and flow character. Because each active ingredient has its own particular physical and chemical properties, dosage formulations and manufacturing techniques must be developed for each active ingredient. The development of dosage formulations and related manufacturing processes is a major expenditure of pharmaceutical manufacturers and research organizations. For example, in order to develop a tablet formulation, many tedious processes, such as milling, sizing, micronizing, and granulating, are often required to pre-treat raw materials and powder mixes. An acceptable tablet formulation must produce tablets having acceptable stability, content uniformity, disintegration and dissolution rates. Also the powder mix must have specific physical properties in order to process the formulation using high speed tableting equipment. In addition, the use of excipients reduces stability, bioavailability and dissolution rate of drugs.

It is an object of the present invention to provide a unit dose device for dispensing an excipient-free comestible product into a liquid.

SUMMARY OF THE INVENTION

The present invention relates to a device for dispensing a comestible product into a liquid, said device comprising dispensing means having an exterior wall and an interior wall and at least one opening and dispersed within said dispensing means is a comestible product having a porous lattice structure, said structure having a shape defined by the interior wall of said dispensing means, with at least a part of said porous lattice structure being communicable with the liquid in which said device is placed.

The present invention further relates to a method for preparing a device for dispensing a comestible product comprising dissolving a comestible product in a suitable solvent and crystallizing the comestible product in a dispensing means having an exterior wall and a smooth interior wall and at least one opening, allowing the comestible product to crystallize within the dispensing means in the form of a porous lattice structure having a shape defined by the interior wall of said dispensing means.

The unit dose delivery device of the present invention is particularly useful for providing measured quantities of an active ingredient to a solution.

DETAILED DESCRIPTION OF THE INVENTION

Brief Description of the Drawings

In FIG. 1, numeral (11) represents a device capable of dispensing a comestible product into a liquid. In this preferred embodiment, the device (11) comprises a dispensing means (16) having an exterior wall (15) and a smooth interior wall (17) and two openings (13, 14) and disposed within the dispensing means (16) is a comestible product (12) in the form of a porous lattice structure having a shape defined by the interior wall (17). The dispensing means (16) may be made of paper or synthetic organic plastic or other suitable material. The shape of the dispensing means (16) is not overly critical, although it is preferred to employ a dispensing means (16) having a cylindrical shape. The dispensing means (16) has an exterior wall (15) and a smooth interior wall (17) in communication with two openings ((13) and (14)). The comestible product (12) disposed within the dispensing means (16) has a porous lattice structure defined by the interior wall (17) of the dispensing means (16). The comestible material may be dispensed into a liquid into which the device (11) of the present invention is placed by stirring the device (11), or allowing liquid to penetrate the porous lattice structure of the comestible material, and the like.

Figure 1:
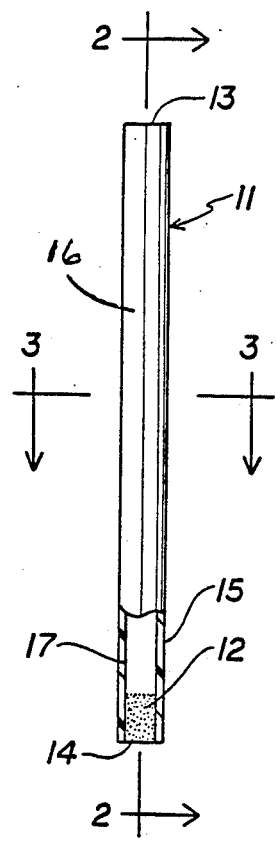
FIG. 1 is an elevational view of a cylindrical unit dose delivery device of a construction in accordance with the present invention.
Figure 2:
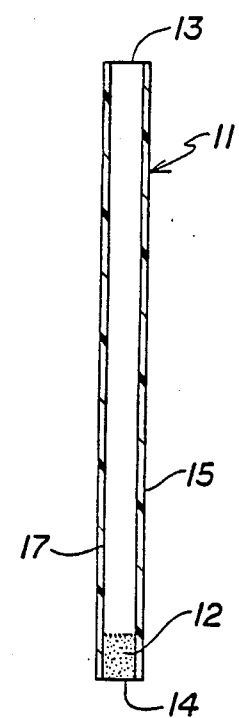
FIG. 2 is a central sectional elevation of the device of FIG. 1, taken along plane 2—2 of FIG. 1.
Figure 3:
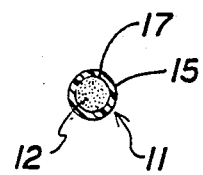
FIG. 3 is a horizontal sectional view of the device of FIG. 1, taken along plane 3—3 of FIG. 1.
Figure 4:
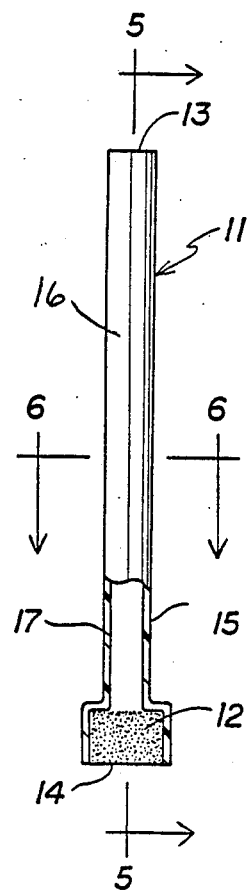
FIG. 4 is an elevational view of a further embodiment of a unit dose delivery device of the present invention.
Figure 5:
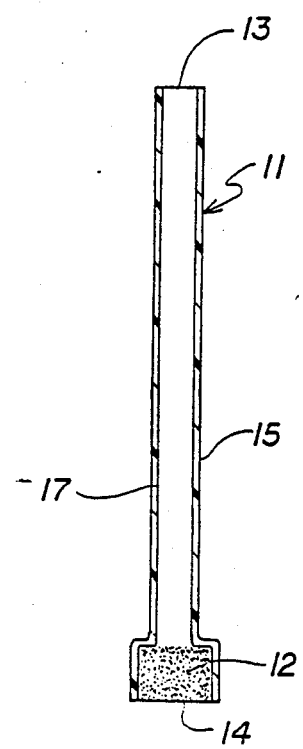
FIG. 5 is a central sectional view of the device of FIG. 4, taken along plane 5—5 of FIG. 4.
Figure 6:
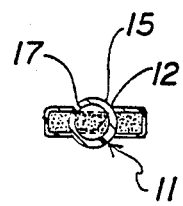
FIG. 6 is a horizontal sectional view of the device of FIG. 4, taken along plan 6—6 of FIG. 4.
Figure 7:
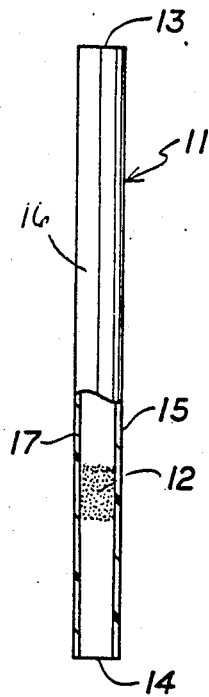
FIGS. 7-9 are elevational views of further embodiments of unit dose devices of the present invention.
Figure 8:
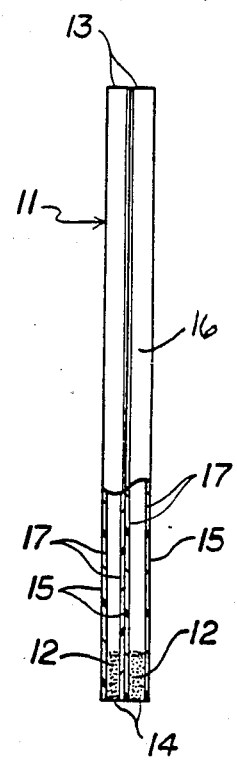
Figure 9:
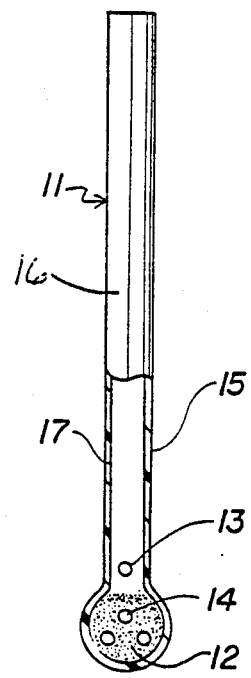

The devices of the present invention preferably comprise a dispensing means having at least two openings wherein at least one of the openings being communicable with the liquid in which said device is placed.

In one embodiment of the present invention the device may be prepared by:

(i) preparing a solution of a comestible product in an appropriate solvent at a temperature sufficient to allow the comestible product to disoolve in the solvent;

(ii) placing a measured amount of the solution into a dispensing means an exterior wall and an interior wall and having at least one opening;

(iii) allowing the solution to cool in the dispensing means at a rate sufficient to allow crystallization of the comestible product within the dispensing means in a porous lattice structure defined by the interior walls of the dispensing means;

(iv) removing excess solvent from the porous lattice structure disposed within the dispensing means.

The comestible products employed herein include for example, edible foods or food additives or pharmaceutical agents which crystallize in essentially a pure porous lattice structured form. Illustrative of edible foods or food additives include sweeteners such as aspartyl-L- phenylalanine methyl ester (APM), saccharin, cyclamate, acesulfame K, the salts thereof and the like.

Representative of the pharmaceutical agents include for example, aspirin, spironolactone, vitamins and the like.

The comestible product must be compatible with a solvent wherein the comestible product will essentially dissolve and subsequently crystallize as a porous lattice structure. In one embodiment, the comestible product is dissolved in a solvent wherein the comestible product is insoluble at lower temperatures, but soluble at elevated temperatures. Therefore, heating a solution containing the comestible product in such a solvent system will dissolve the comestible product in the solvent system. Subsequent cooling of the solution within a dispensing means will permit the comestible product to crystallize in the form of a porous lattice structure having a shape defined by the interior wall of the dispensing means. It should be noted that the porous lattice structure thus formed contains essentially pure comestible product. The excess solvent is removed by conventional techniques. Thus, the preparation of the devices of the present invention may be utilized as the final purification step in the preparation of a comestible product.

Whereas the methods of the prior art tend to precipitate a powder or granular crystal on the walls of the earlier dispensing devices, the present invention crystallizes a porous compound with a defineable size and shape. The powder and granular crystals known in the art have been unable to maintain a sufficient bond with the surface on which they crystallize to enable their use in the coating of smooth walled surfaces such as the inner surface of a straw. The crystallization techniques of the present invention allow this.

The method of crystallization of the present invention is unlike anything disclosed in the prior art in that the dispensing device or straw is directly immersed into a solvent containing the dissolved comestible. Crystallization is triggered by changing the solvent polarity or temperature. The dispensing filled with porous crystalline structure and solvent, is then removed from the crystallization container and any excess liquid is removed from the porous lattice structure through the use of a suction filter device. The excess solvent is not removed by evaporation. This removal step illustrates another critical distinction of the present invention from the prior art. This type of porous crystalline network spreads throughout the entire space or volume of a dispensing device while in the liquid phase prior to crystallization and will adhere to the smooth walled surface when crystallized. This allows removal of the dispensing device from the container without the crystals falling out. Such a crystalline network adheres to tne walls and holds the solvent to form a gel-like mass that will stay inside the straw prior to solvent removal. The powder and crystal granules of the prior art will sink to the bottom of the coatinq and will fail to form a homogeneous comestible dispersion throughout the desired volume of the dispensing device. After removing any excess solvent, the porous crystalline network of this device will remain reasonably from within the dispensing device.

The process by which the solution is removed from the stirrer during crystallization in the prior art is generally either by evaporation or hot-melt. Compositions formed by a hot melt process cool to non-porous solids which are slow to dissolve. Evaporation results in the presence of impurities within the deposited flavor ingredient and does not allow one to control the size, shape and crystal form of the unit dose. In addition, evaporation continuously concentrates the surface solution which creates a thick surface film which is slow to dissolve and not penetrable by air or liquid. These crystalline structures cannot be used to practice this invention since they seal off the opening of the dispensing device and block communication with the liquid. The crystallization method of the present invention, which makes very porous crystalline structures and removes the solvent by suction, provides the air and liquid penetrable feature. This method permits the mass production of hundreds or even thousands of dispensing means at one time by inserting for example, a bundle of straws into a large vat of solubilized comestible. After crystallization, solvent can be removed by gravity or suction and many straws are thereby prepared at one time.

The solvent or mixtures of solvents employed as the solvent system utilized to prepare the devices of the present invention vary with each active ingredient and are readily ascertained by one of ordinary skill in the art. For example, the preferred solvent for preparing devices containing aspartame is hot water or a hot water-alcohol solution, such as a hot water-methanol solution. The preferred solvent for preparing devices containing aspartame sulfate is a water-alcohol solution containing a ratio of water/alcohol in the range of from about 1:25 to 1:5. The preferred solvent for preparing devices containing sodium saccharin is a mixture of water:methanol:isopropanol in a ratio of from about 2:2:40 to 6:5:80.

In addition, the devices of the present invention may be prepared utilizing a two solvent system. The comestible product is dissolved in the first solvent. To the resulting solution is added a second solvent which is miscible with the first solvent but wherein the comestible product is insoluble. The resulting mixture is placed within a suitable dispensing means and the comestible product will crystallize in the form of a porous lattice structure having a shape defined by the interior wall of the dispensing means.

In accordance with the present invention solutions containing from 4 to 40% by weight of a comestible product in a solvent system may be employed.

The devices of the present invention may be utilized to dispense one or more comestible products into a liquid. Therefore, included within the scope of the present invention are devices wherein one or more comestible products are crystallized in a porous lattice structure disposed within the dispensing means. The preparation of a device of the present invention containing two or more comestible products is accomplished using techniques such as, for example, co-precipitation, entrapment of a second comestible product within the porous lattice structure of the first comestible product or addition of a solution of the second comestible product to the porous lattice structure formed by the first comestible product followed by removal of the solvent. The term "co-precipitation" as used herein includes dissolving multiple comestible products in a solvent system and then allowing the comestible products to simultaneously form a porous lattice structure within the dispensing means. Entrapment of a second comestible product within the porous lattice structure formed by a first comestible product is accomplished by adding the second comestible product to a solution comprising the first comestible product dissolved in a solvent system wherein the second comestible product is insoluble.

Therefore, as the first comestible product crystallizes, the second comestible product which is insoluble in the solvent becomes entrapped within the resulting porous lattice structure. A third method for incorporating a second comestible product within the device of the present invention, is to add a solution containing the second comestible product in a solvent wherein the first comestible product is insoluble, to the porous lattice structure formed by the first comestible product and subsequently removing the solvent.

The porous lattice structure characteristics of the comestible product disposed within the dispensing means is utilized to replace the bulking effect of excipients. For example, the density of aspartame and aspartame sulfate in a porous lattice structure as in the present invention is within a range of from about 0.07-0.2 g/cc. Thus the porou lattice structures utilized in the present invention are about 5 to 30 times bulkier than conventional compressed tablets containing aspartame or aspartame sulfate whose densities are often greater than 1.0 g/cc.

A comestible product having a porous lattice structure has an increased surface area and dissolution rate when compared to a comestible product in a conventional unit dose form, such as tablets. For example, aspartame sulfate in the form of a porous lattice structure dissolves extremely fast with respect to conventional compressed tablets containing aspartame sulfate.

An additional advantage of the new dosage forms of the present invention is that the dosage forms are essentially excipient free. This provides significant advantages over conventional dosage forms and in particular allows the new dosage forms to be utilized in formulations requiring high dissolution rate, stability or increased bioavailability.

In addition, the comestible product in the form of a porous lattice structure may be removed from the dispensing means and utilized as a unit dose tablet or the like. If employed in this manner, it is preferred to remove the porous lattice structure prior to removing excess solvent. If a pure form of a comestible product as a porous lattice structure is too fragile for handling, surface spraying the porous lattice structure with a binder solution, such as a 5% polyvinyl pyrrolidone (PVP) in alcohol solution, may reduce this problem.

As used herein, the term "dispensing means" refers to a structure capable of dispensing or delivering a comestible product disposed therein, in a liquid. Various modifications of the illustrated structures in the above FIGURES may be made within the scope of this invention. The cross-sections of the dispensing means may be modified so as to be of different geometric shapes, e.g., hexagonal, fluted, triangular, star-shaped, etc. The dispensing means, if tubular in shape, may have plugs inserted, molded or pressed in to block off the comestible product from the ends of the dispensing means. In addition, the comestible product may be covered over with sealing means which do not cover the entire device, e.g., pressure sensitive tapes, to further protect them.

The preferred materials of construction of the dispensing means are plastics. These may be molded or extruded in the shapes illustrated, with perforations, crimps, projections, grooves, slots, and undercuts, or may be produced in tubular or rod form and the desired configurations may be subsequently made by piercing, perforating, cutting, routing, etc. Also modifications of the illustrated structures can be employed. However, for ease of manufacture and cost effectiveness a cylindrical form is preferred. Moreover, since the process of the present invention results in crystals that adhere or are weakly bonded to the inner surface of the dispensing means, smooth inner walls such as those of a straw are preferred so as to expedite quick APM dissolution into the liquid. Although paper may be used, when employed it is preferably treated with plastic or other material to improve wet strength of the device. Almost all non-toxic thermoplastic or thermosetting synthetic organic polymers are useful, but, as a practical matter, with respect to ease of manufacture and economic considerations, the most important of these are polypropylene and polyethylene, both of which can be made with and processed by high speed extrusion, perforating and filling equipment. Such plastics may be made transparent or translucent and the user of the device is able to detect the extent to which active ingredient had been consumed.

The following examples are provided to further demonstrate the principles and the applications of this invention.

EXAMPLE 1. Aspartame Sulfate Stirrer

One end of commercial plastic straws (10" long×0.25" dia.) were heat-sealed at a ~45° angle and a small hole was cut open at the tip. An aspartame sulfate solution was prepared by dissolving 10.0 g of aspartame (~96% pure) in a warm solution containing 1.667 g sulfuric acid (96% pure) in 10 mls. distilled water. To the resulting solution was added 100.0 mls. of cold ethanol and the resulting solution was mixed. The straws were immersed into the solution. Aspartame sulfate began to crystallize within each straw within 30 seconds. After about 30 minutes, the straws were removed from the solution and placed on absorbent paper to drain the solvent and allow the aspartame sulfate which had crystallized in the form of a porous lattice structure to dry. The devices thus prepared were effective in delivering aspartame sulfate into cold solutions.

EXAMPLE 2. Preparation of Aspartame Sulfate Tablets

Plastic straws, (10" long×0.25" diameter), were used. An aspartame sulfate solution was prepared using the procedure given in Example 1. The straws were bound together with two rubber bands and immersed into an aspartame sulfate solution as soon as the solution is prepared. After 30 minutes the straws were removed from the solution and placed on absorbent paper to remove part of the solvent. The aspartame sulfate that had crystallized in the form of a porous lattice structure was pressed to desired thickness, pushed out of the straw using a plunger. The wet "tablet" thus prepared was dried of an absorbent paper. A binder solution, 5% PVP in alcohol, was sprayed on the tablets and the tablets were allowed to air dry. The tablets thus obtained dissolve rapidly in cold beverages.

EXAMPLE 3. Preparation of Aspartame Tablets

The procedure of Example 2 is followed except that an aspartame solution, prepared by dissolving 7.0 g of aspartame in 100 mls. hot distilled water, was used in lieu of aspartame sulfate solution. The aspartame crystallized in the form of a porous lattice structure within the straws in approximately two (2) hours. In cold water, the aspartame tablets thus produced disintegrate quickly upon stirring and dissolve faster than aspartame powder.

EXAMPLE 4. The Density of Unit Dose Tablets (1) Aspartame Sulfate Tablet - A pure aspartame sulfate tablet obtained from Example 2, neither compressed nor coated with PVP, has a size of 11 mm long×5.5 mm diameter and weighs 23 mg. Therefore its density is 0.088 g/cc. An aspartame sulfate tablet coated with PVP has a size of 9 mm long×5.5 mm diameter and weighs 25 mg. Therefore its density is 0.12 g/cc.

(2) Aspartame Tablet - A pure aspartame tablet obtained from Example 3, neither compressed nor coated with PVP, has a size of 10 mm long×5.5 mm diameter and weigh 22 mg. and a density of 0.093 g/cc.

EXAMPLE 5. Sodium Saccharin Stirrer

Sodium saccharin, (4.0 g), was dissolved in 4.0 mls. of distilled water and 3.0 mls. of methanol. The resulting solution was heated to about 60° C. To the solution was added isopropyl alcohol, preheated to about 65° C., until a volume of 60 mls. was attained. The resulting solution was mixed and a total of 100 straws, 130 mm long×3 mm diameter, were inserted into the solution. Upon cooling, sodium saccharin crystallizes within the straws in the form of fluffy needle crystals having a porous lattice structure. After the solution was cooled to room temperature, the straws were removed and placed on an absorbent paper to drain the solvent. The straws were air dried overnight. The sodium saccharin crystallized within the straws dissolves instantly in cold water.

EXAMPLE 6. Aspartame Stirrer 10.0 g of aspartame was dissolved in 100 mls. of hot water. Plastic straws (4 mm i.d.) held together with rubber bands were dipped into the aspartame solution and aspartame crystallization within the straws in the form of a porous lattice structure was completed by cooling the solution to about 40° C. and then to 5° C. The straws were removed from the solution and vertically placed on absorbent paper to drain remaining solution. The wet straws were then dried in a vacuum oven at 50° C. overnight.

In hot drinks such as coffee and the tea the stirrer straw containing aspartame released aspartame rapidly which dissolved immediately.

EXAMPLE 7. Flavored Aspartame And Aspartame Sulfate Stirrers

The following solutions were prepared:
1. 2.50 g citric acid and 0.50 g artificial lemon-lime flavor #576 (Felton) were dissolved in 22.0 g of absolute ethanol.
2. 2.50 g citric acid and 0.50 g artificial orange oil California type #430 (Felton) were dissolved in 22.0 g of absolute ethanol.
3. 2.50 g citric acid and 0.50 g artificial cherry flavor #306 (Felton) were dissolved in 22.0 g absolute ethanol.

Six drops of one of the above solutions were added to an aspartame tablet prepared according to Example 3 or an aspartame sulfate tablet prepared according to Example 2. The tablet was placed on a metal screen. Alternatively, the above solutions may be added to the aspartame sulfate stirrer of Example 1 through the empty end of the stirrer. The wet dosage forms thus prepared were then dried in a vacuum oven. When these flavored dosage forms were dissolved in cold water, the resulting solution had a sweet, flavored taste.

EXAMPLE 8. Aspartame and Saccharin Combination Stirrer

Sodium saccharin (4.0 g) was dissolved in a mixture of 3.0 mls. methanol and 4.0 mls. of water. Aspartame powder (5.0 g) was added to this solution and the resulting solution was mixed. A boiling solution of isopropanol (80 mls.) was added to the solution and the resulting mixture was agitated to dispense undissolved aspartame into a homogeneous suspension. About 100 plastic drinking straws of 5½ inches long×4 mm inside diameter bonded by a rubber band were inserted into the mixture. The mixture containing the straws was cooled to room tempature and then to below 0° C. The solvent within the straws was removed by vacuum filteration. The 10% PVP/isopropanol solution was sprayed on the end of the straw wherein the aspartame and saccharin had crystallized in the form of a porous lattice structure and the straws were air dried. The aspartame:saccharin product thus prepared dissolves quickly in cold water.

EXAMPLE 9. Calcium Cyclamate and Sodium Cyclamate Combination Stirrer

The stirrers of this example were prepared in accordance with the same procedure of Example 10 except that:

1. A solution containing 20.0 g of calcium cyclamate, dissolved in a hot solution containing 20.0 mls. water and 80 mls. of ethanol was utilized.
2. A solution containing 20.0 g of sodium cyclamte dissolved in a hot solution containing 30 mls. water and 70 mls. of ethanol.

The solutions were cooled to a temperature below 0° C. to precipitate the sweeteners in stirrers. The solvents were then removed by vacuum filtration.

EXAMPLE 10. Sodium Cyclamate and Aspartame Combination Stirrer

The same procedure used in Example 8 was utilized employing a solution containing 5.0 g of sodium cyclamate and 5.0 g of aspartame dissolved in a hot solution containing 20 mls. water and 80 mls. ethanol. The sodium cyclamate and aspartame were co-precipitated within a straw at a temperature of less than 0° C., and the remaining solvent was removed by vacuum filteration.

EXAMPLE 11. Content Uniformity of a Pure Aspartame Sulfate Unit Dose

Empty capsule and tablet unit dose blisters having five small holes drilled on both the top and bottom of each blister were utilized as the dispensing means. An aspartame sulfate solution was prepared by dissolving 1.66 g of sulfuric acid (96%) and 10.0 g of aspartame (96% pure) in 20 mls. warm distilled water. The aqueous solution was added to 250 mls. of ethanol preheated to 60° C.

The blisters were completely immersed within the hot aspartame sulfate solution. Upon cooling the solution, aspartame sulfate crystallizes in the form of a porous lattice structure. Following crystallization of the aspartame sulfate in the form of a porous lattice structure, the blisters were recovered, cleaned, and the solution remaining within the blisters was removed. The blisters were then air dried. Each blister was analyzed to determine aspartame content ("APM Content") and content uniformity. The results obtained are illustrated in Table I.

TABLE I

| SAMPLE I.D. | APM CONTENT (mg./dose) |
|---|---|
| Tablet blister 1 | 24.8 |
| Tablet blister 2 | 25.4 |
| Tablet blister 3 | 25.0 |
| Tablet blister 4 | 24.6 |
| Tablet blister 5 | 23.8 |
| Tablet blister 6 | 23.8 |
| Tablet blister 7 | 26.1 |
| Tablet blister 8 | 26.1 |
| Tablet blister 9 | 24.5 |
| Tablet blister 10 | 24.8 |
| Tablet blister 11 | 23.3 |
| Tablet blister 12 | 23.6 |
| Tablet blister 13 | 24.3 |
| Tablet blister 14 | 24.0 |
| Tablet blister 15 | 25.5 |
| Capsule Blister 1 | 42.7 |
| Capsule Blister 2 | 41.7 |
| Capsule Blister 3 | 42.9 |
| Capsule Blister 4 | 44.1 |
| Capsule Blister 5 | 41.2 |
| Capsule Blister 6 | 41.7 |

EXAMPLE 12. Content Uniformity of Unit Dose Devices Containing Pure Spironoloactone Spironolactone (10.0 g) was dissolved in 300 mls. of hot methanol at a temperature of approximately 65° C. A total of 10 unit dose capsule blisters with small holes were immersed in the hot solution. On cooling, spironolactone crystallized in the form of long needle crystals. Following crystallization of the spironolactone, the solution remaining within the blisters was removed and the blisters were dried. The spironolactone content uniformity of the blisters was determined and results are illustrated in the following table:

TABLE II

| SAMPLE | SPIRONOLACTONE CONTENT (mg/dose) |
|---|---|
| 1. | 64.8 |
| 2. | 65.5 |
| 3. | 63.6 |
| 4. | 64.3 |
| 5. | 63.4 |
| 6. | 63.2 |
| 7. | 65.0 |
| 8. | 63.5 |
| 9. | 63.9 |
| 10. | 63.8 |

Although this invention has been described with respect to specific applications, the details thereof are not to be construed as limitations, for it will be apparent that various equivalents, changes and modificiations may be resorted to without departing from the spirit and scope thereof and if is understood that such equivalent embodiments are intended to be included herein.

What is claimed is:

1. A process for preparing a comestible containing stirrer straw comprising the sequential steps of:
   (i) dissolving a desired comestible which is capable of crystallizing in essetially a pure porous lattice structured form into a solvent at an appropriate temperature to create a solution;
   (ii) directly immersing said straw into said solution so that a measured amount of said solution fills said stirrer straw which comprises an exterior wall, a smooth interior wall and at least two openings;
   (iii) changing the polarity or temperature of said solvent and allowing said solution to crystallize within said straw as a comestible in the form of a porous lattice structure that is substantially contiguous throughout the volume occupied by the solution and is thereby defined by the interior walls of said straw;
   (iv) removing said straw from said solution; and
   (v) removing excess solvent from said porous lattice structure by either suction or gravity leaving said crystallized porous lattice comestible disposed within said stirrer straw and adhered to the smooth interior wall and having a shape defined by said interior wall.

2. The process of claim 1 wherein said solvent is removed from said porous lattice structure by suction.

3. The process of claim 1 wherein said solvent is removed from said porous lattice structure by means of gravitational drainage.

4. The process of claim 2 or 3 wherein said comestible is crystallized by cooling said solution at a suitable rate to approximately room temperature.

5. The process of claim 4 wherein said comestible is a sweetener.

6. The process of claim 5 wherein said sweetener is selected from the group consisting essentially of aspartame, saccharin, cyclamate, acesulfam-K, their salts and mixtures thereof.

7. The process of claim 2 or 3 wherein said comestible is crystallized by changing the polarity of the solution.

8. The process of claim 7 wherein said polarity is changed by adding a solvent to said solution comprising absolute alcohol.

9. The process of claim 8 wherein said comestible is a sweetener.

10. The process of claim 9 wherein said sweetener is aspartame sulfate.

11. The process of claim 1 wherein said porous lattice structure is removed from said stirrer straw to produce a unit dose form of said comestible product.

12. A device for dispensing a comestible product into a liquid comprising a stir straw that contains a comestible in a crystallized porous lattice structure that is substantially free of impurities and is defined by the interior walls of said straw produced by the method of claim 1.

13. The device of claim 12 wherein said comestible is a sweetener.

14. The device of claim 13 wherein said sweetener is selected from a group consisting essentially of aspartame, saccharin, cyclamate, acesulfam-K, their salts and mixtures thereof.

15. The device of claim 14 wherein said sweetener is aspartame sulfate.

* * * * *

UNITED STATES PATENT AND TRADEMARK OFFICE
CERTIFICATE OF CORRECTION

PATENT NO. : 4,816,268
DATED : March 28, 1989
INVENTOR(S) : Josef H. Tsau

It is certified that error appears in the above-identified patent and that said Letters Patent is hereby corrected as shown below:

In the bibliographical data:
Add--(73) Assignee: The NutraSweet Company,
Skokie, Ill.--

Column 2, Line 53:
delete "disoolve" and insert therefor--dissolve--

Column 2, line 54:
insert -- comprising -- after "dispensing means" and before "an exterior wall".

Column 3, line 40:
insert -- device -- after "dispensing" and before "filled"

Column 3, line 55:
delete "wil1" and insert therefor -- will--

Column 3, line 57:
delete "coatinq" and insert therefor -- coating --

Column 3, line 61:
delete "from" and insert therefor -- firm --

Column 4, line 5:
insert --is-- after "and" and before "not"

Column 5, line 17:
delete "porou" and insert therefor --porous--

Column 8, line 14:
delete "tempature" and insert therefor --temperature--

Column 8, line 15:
delete "filteration" and insert therefor --filtration--

Column 8, line 25:
delete "Example 10" and insert therefor --Example 8--

UNITED STATES PATENT AND TRADEMARK OFFICE
CERTIFICATE OF CORRECTION

PATENT NO. : 4,816,268
DATED : March 28, 1989
INVENTOR(S) : Josef H. Tsau

It is certified that error appears in the above-identified patent and that said Letters Patent is hereby corrected as shown below:

Column 8, line 30:
delete "cyclamte" and insert therefor --cyclamate--

Column 8, line 45:
delete "filteration" and insert therefor --filtration--

Column 9, line 61:
delete "essetially" and insert therefor --essentially--

Signed and Sealed this

Twelfth Day of December, 1989

*Attest:*

JEFFREY M. SAMUELS

*Attesting Officer*  Acting Commissioner of Patents and Trademarks